(12) United States Patent
Kambe

(10) Patent No.: US 6,385,360 B1
(45) Date of Patent: May 7, 2002

(54) LIGHT CONTROL DEVICE AND A METHOD FOR MANUFACTURING THE SAME

(75) Inventor: Toshiyuki Kambe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/378,721

(22) Filed: Aug. 23, 1999

(30) Foreign Application Priority Data

Aug. 25, 1998 (JP) ............................................ 10-238345

(51) Int. Cl.[7] .............................. G02B 6/12; G02B 6/42
(52) U.S. Cl. ............................. 385/14; 385/40; 385/41; 385/131
(58) Field of Search ............................. 385/14, 40, 41, 385/131

(56) References Cited

U.S. PATENT DOCUMENTS

| 5,153,930 A | 10/1992 | Dupuy et al. ................. 385/14 |
| 5,214,724 A | 5/1993 | Seino et al. ................... 385/8 |
| 5,661,830 A | 8/1997 | Nishimoto .................... 385/40 |

FOREIGN PATENT DOCUMENTS

| JP | 3-253815 | * 11/1991 |
| JP | 7-20176 | * 1/1995 |
| JP | 9-236782 | * 9/1997 |
| JP | 9-258152 | * 10/1997 |
| JP | 10-54964 | 2/1998 |

* cited by examiner

Primary Examiner—Scott J. Sugarman
(74) Attorney, Agent, or Firm—McGinn & Gibb, PLLC

(57) ABSTRACT

A substrate 1 having a pyroelectric effect has an optical waveguide 2 formed in it, and the optical waveguide 2 is provided with a buffer layer 3, a low resistance film 4 and an electrode 6 on it. The resistance value of the low resistance film 4 is made as small as possible or is set at a value determined according to the capacitances of the buffer layer 3 and the optical waveguide 2. The width of a part where the low resistance film 4 is in contact with the substrate 1 and the thickness of the substrate 1 also are set at a specified value. Furthermore, the specific heat and the thermal capacity of a package for housing this light control device also are set at specified values.

20 Claims, 8 Drawing Sheets

LIGHT CONTROL DEVICE AND A METHOD FOR MANUFACTURING THE SAME

BACKGROUND OF THE INVENTION

1. Field of the Invention

The present invention relates to a light control device used in an optical communication system or an optical information processing system and a method for manufacturing the same device, and more particularly to a light control device capable of suppressing its operating point shift at the time of a temperature change and a method for manufacturing the same device.

2. Description of the Related Art

Up to now a light control device has a structure added for suppressing variation (DC drift) of a bias point to be a base point for operation.

A light control device controls the phase and the intensity of a wave-guided light usually by means of an elector-optic effect and the like. For this, it generates an Electro-optic effect and the like by applying an electric field to an optical waveguide from an electrode provided on the optical waveguide. A light control device can be considered equivalently as a parallel circuit of a capacitor and a resistor to an electric field inputted. Therefore, a DC component contained in an applied electric field generates a transient response to a stepped input and thereby varies the electric field applied to an optical waveguide. Due to such variation of the electric field the bias point of a light control device varies and the level of an optical waveform outputted varies. This variation is a DC drift. Up to now a DC drift has been suppressed by increasing equivalently a resistance value between the electrodes by means of a composition insulating a low resistance film at plural spots.

In a device of this kind, however, since its substrate has a pyroelectric effect, in case that there is a temperature change even under a non-bias condition, an electric charge is generated in the interface between the surface of the substrate and a buffer layer. This phenomenon is called a non-bias temperature shift (temperature shift). Since a conventional device does not have a measure to suppress such a temperature shift, it has had a problem that the yield rate of manufacture is degraded due to such a temperature shift at the time of manufacturing the devices.

SUMMARY OF THE INVENTION

An object of the present invention is to provide a light control device capable of suppressing a temperature shift.

A light control device according to the present invention comprises an optical substrate having a pyroelectric effect, a buffer layer formed on said optical substrate, and a first low resistance film covering said buffer layer.

As a concrete composition, in particular, a light control device of the present invention is provided with two optical wave guides near each other, a buffer layer, a low resistance film, a signal electrode, and two ground electrodes.

The two optical wave guides near each other are formed on a crystal substrate having an Electro-optic effect. The buffer layer is formed on part of the optical wave guides and has a smaller dielectric constant than said crystal substrate. The low resistance film is formed on the buffer layer and part of the substrate, and has a smaller resistance value than any of the buffer layer and the substrate. The signal electrode is formed in the vicinity of each of the two optical wave guides. The ground electrodes are formed opposite to each other with the signal electrode between them. The low resistance film is cut at plural spots in the vicinity of the optical wave guides.

A light control device manufacturing method according to the present invention is a method for manufacturing a light control device comprising an optical substrate having a pyroelectric effect, a buffer layer formed on said optical substrate and a first low resistance film covering said buffer layer, said method comprising a process of forming said buffer layer on said optical substrate and a process of forming said first low resistance film covering said buffer layer.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Prior to description of a light control device according to the present invention, a conventional light control device is described in order to make it easy to understand the invention.

A conventional light control device has a structure added to it for suppressing variation of a bias point (DC drift). For example, Japanese Patent Laid-Open Application No.Hei 10-54964 has disclosed that a DC drift is suppressed by forming a double-slit structure in a low resistance film formed on a buffer layer and the surface of a substrate.

Figure 1:
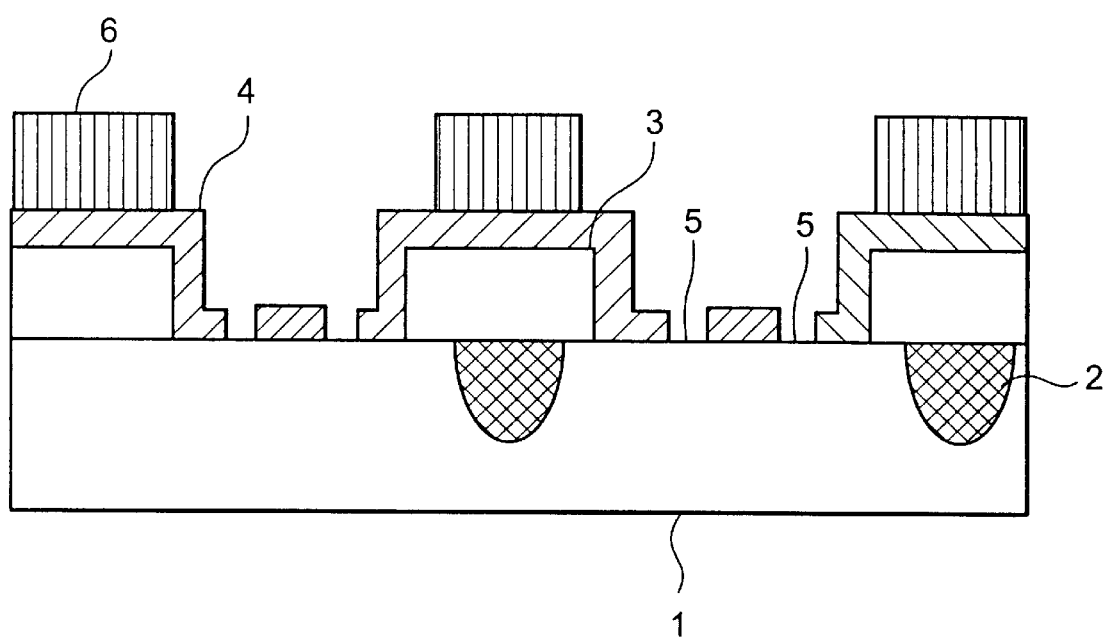
FIG. 1 is a sectional view showing the composition of a conventional light control device.

FIG. 1 shows a sectional view of a conventional light control device. In this light control device, an optical waveguide 2 is formed on a crystal substrate 1 having an electro-optic effect. The optical waveguide 2 is formed by a Ti diffusion. And a buffer layer 3 having a smaller dielectric constant than the optical waveguide domain is formed on part of the optical waveguide 2, a low resistance film 4 being lower in resistance than the waveguide domain is formed on the buffer layer and part of the substrate, and an electrode 6 is formed on the low resistance film 4. The low resistance film 4 is insulated at plural spots in the vicinity of the optical waveguide 2. This light control device is manufactured in the following manner.

First, a high refractive index domain to be an optical waveguide 2 is formed by thermally diffusing a Ti film patterned by means of a photolithography process in a crystal substrate having an electro-optic effect. Next, a buffer layer 3 having a low dielectric constant is formed on part of the optical waveguide. Moreover, a low resistance film 4 is formed on the buffer layer 3 and the surface of the substrate including the optical waveguide 2. This low resistance film 4 is insulated at plural spots in the vicinity of the optical waveguide 2 by means of a photolithography process and an etching process (double-slit structure). Finally, a desired light control device is obtained by arranging an electrode in the vicinity of the optical waveguide through the buffer layer 3 and the low resistance film 4.

This light control device induces an electro-optic effect and the like in the vicinity of the optical waveguide 2 in the crystal substrate 1 by applying an electric field to the optical waveguide 2 through the electrode 6. It controls the phase and the intensity of a wave-guided light by this. At this time, a stepped input results in being applied by the DC component of the applied electric field. Since the light control device acts equivalently as a parallel circuit of a capacitor and a resistor to an applied electric field, it generates a transient response to a stepped input in an electric field in the vicinity of the optical waveguide 2. Due to time variation of the transient response, the level of an optical waveform outputted from the light control device is shifted. This shift is a DC drift. The conventional technology has suppressed a DC drift by increasing equivalently a resistance value between the electrodes by means of a structure in which the low resistance film 4 is insulated at plural spots.

In a conventional light control device, however, since its substrate has a pyroelectric effect, in case that there is a temperature change even under a non-bias condition, an electric charge is generated in the interface between the surface of the substrate and a buffer layer. This electric charge distribution applies an electric field to an optical waveguide and thereby an electro-optic effect varies the refractive index of the optical waveguide. Due to this, the bias point of operation is varied and the level of the optical waveform is shifted. As described above, this phenomenon is called a non-bias temperature shift (temperature shift). In a conventional device, no particular measure is taken to counter this temperature shift. Therefore, degradation of the yield rate of manufacture caused by a temperature shift characteristic deterioration in manufacturing the devices has become a problem.

On the other hand, the present invention employs a structure for reducing a temperature shift. By using a structure of the present invention, it is possible to neutralize an electric charge generated on the surface of a substrate in a short time and suppress a non-bias temperature shift.

First, in order to derive a structure of the present invention, a theoretical examination using an equivalent circuit is shown in the following. A guideline for reducing a non-bias temperature shift is shown on the basis of a result of this examination.

Figure 2:
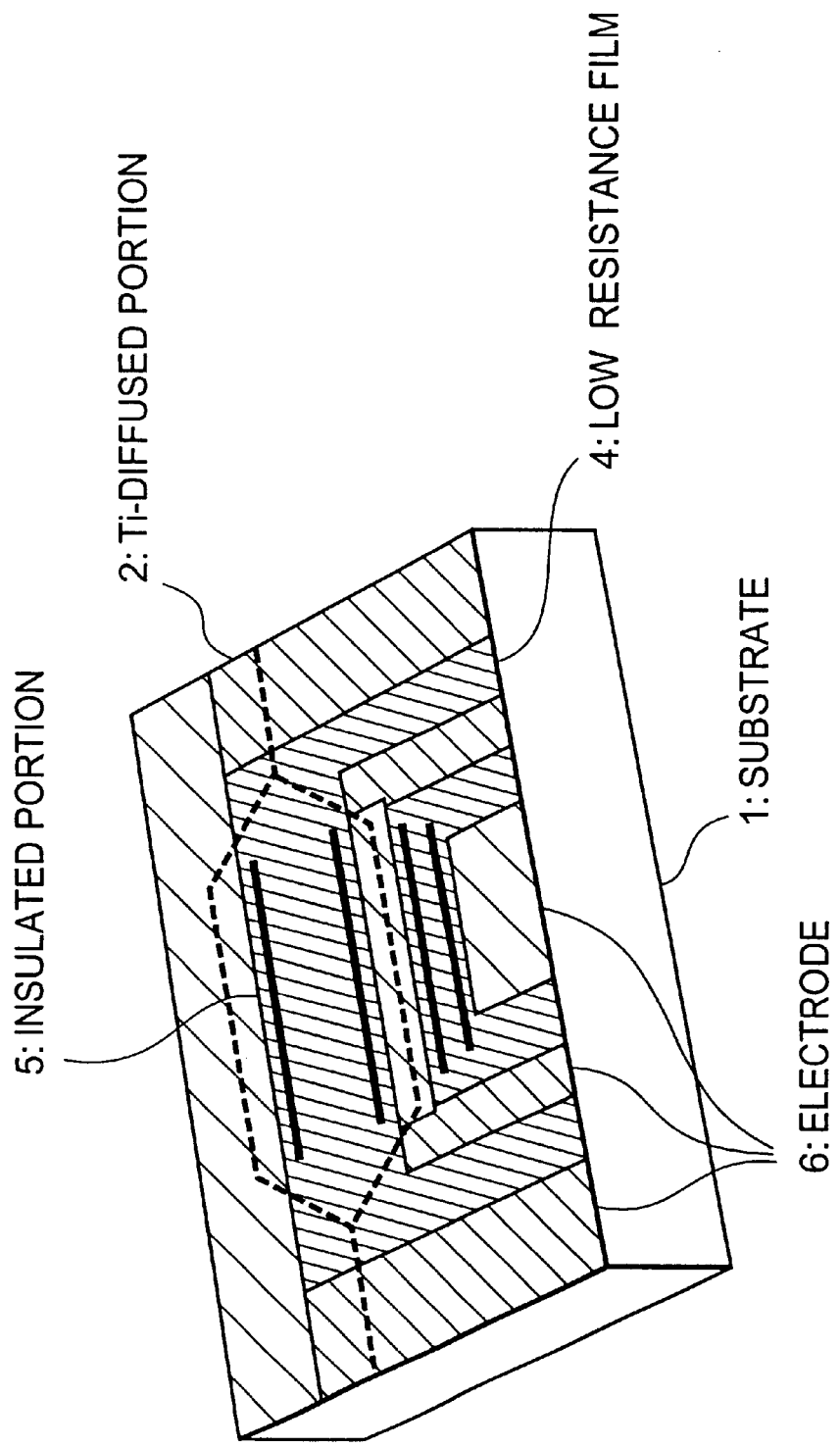
FIG. 2 is a perspective view showing the composition of a light control device according to a first embodiment of the present invention.

FIG. 2 shows a perspective view of a light control device of this embodiment. In FIG. 2, an optical waveguide 2 is formed by performing a Ti diffusion on the surface of a Z-plate LiNbO$_3$ (LN) substrate. In this case an optical modulator using a Mach-Zehnder interferometer is assumed as a light control device. An electrode 6 is formed on a branched waveguide through a buffer layer and a low resistance film 4 which are not shown. The phase of a wave-guided light propagating through each branched waveguide is changed by applying an electric field to the optical waveguide from an electrode on the branched wave guide. The wave-guided lights which have propagated through the respective branch wave guides are coupled again. The coupled light has been applied with an intensity modulation according to variation of an electric field given to said electrode.

Figure 3A:
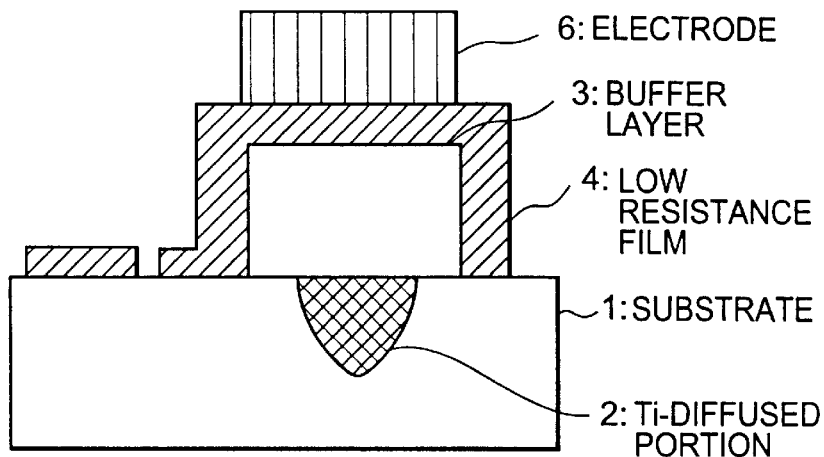
FIG. 3A is a sectional view of the optical device.
Figure 3B:
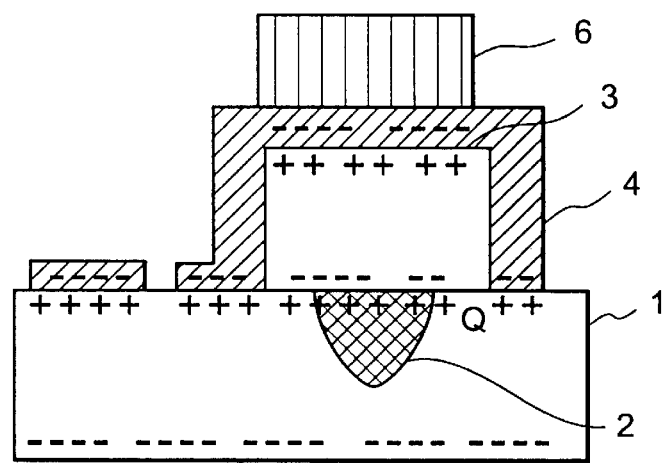
FIG. 3B shows an electric charge distribution generated by a pyroelectric effect of the substrate at the time of a temperature change and FIG. 3C shows an equivalent circuit of the temperature shift.
Figure 3C:
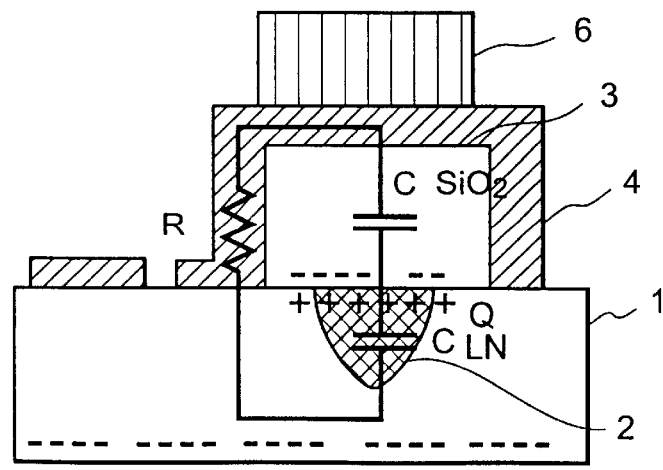

FIG. 3 is a sectional view of an optical modulator according to this embodiment. FIG. 3A shows a case where there is not a temperature change and no electric charge is generated on the surface of the substrate. FIG. 3B shows a case where an electric charge caused by a pyroelectric effect is generated on the surface of a Z-plate LiNbO$_3$ (LN) substrate due to variation in temperature of the substrate 1. In FIG. 3B, the surface of the low resistance film 4 is electrically neutralized by being supplied with an electric charge which is inverse in polarity and equal in quantity to the electric charge generated in the vicinity of the surface of the substrate 1. On the other hand, in the interface between the buffer layer 3 and the substrate 1, an electric charge which has been left without being neutralized generates an electric field in the optical waveguide 2. It is assumed that an electric charge generated in the interface between the surface of the substrate 1 and the buffer layer 3 is Q. FIG. 3C shows an equivalent circuit where the optical waveguide 2 and the buffer layer 3 are respectively CLN and CSiO$_2$ in capacitance, and the low resistance film 4 is R in resistance. When a step-type temperature change generates an electric charge Q at time "t=0", a voltage V(t) to be given to the optical waveguide at time t is given by the following expression:

$$V(t) = \frac{Q}{C_{LN}} \exp\left(-\frac{t}{\tau}\right) \quad (1)$$

where "$\tau = CSiO_2 \cdot R$" is assumed. As known from the expression (1), the temperature shift V(t) is exponentially decreased. It is known from the expression (1) that it is effective to suppression of the temperature shift to decrease Q, increase CLN and decrease $\tau$.

Figure 4:
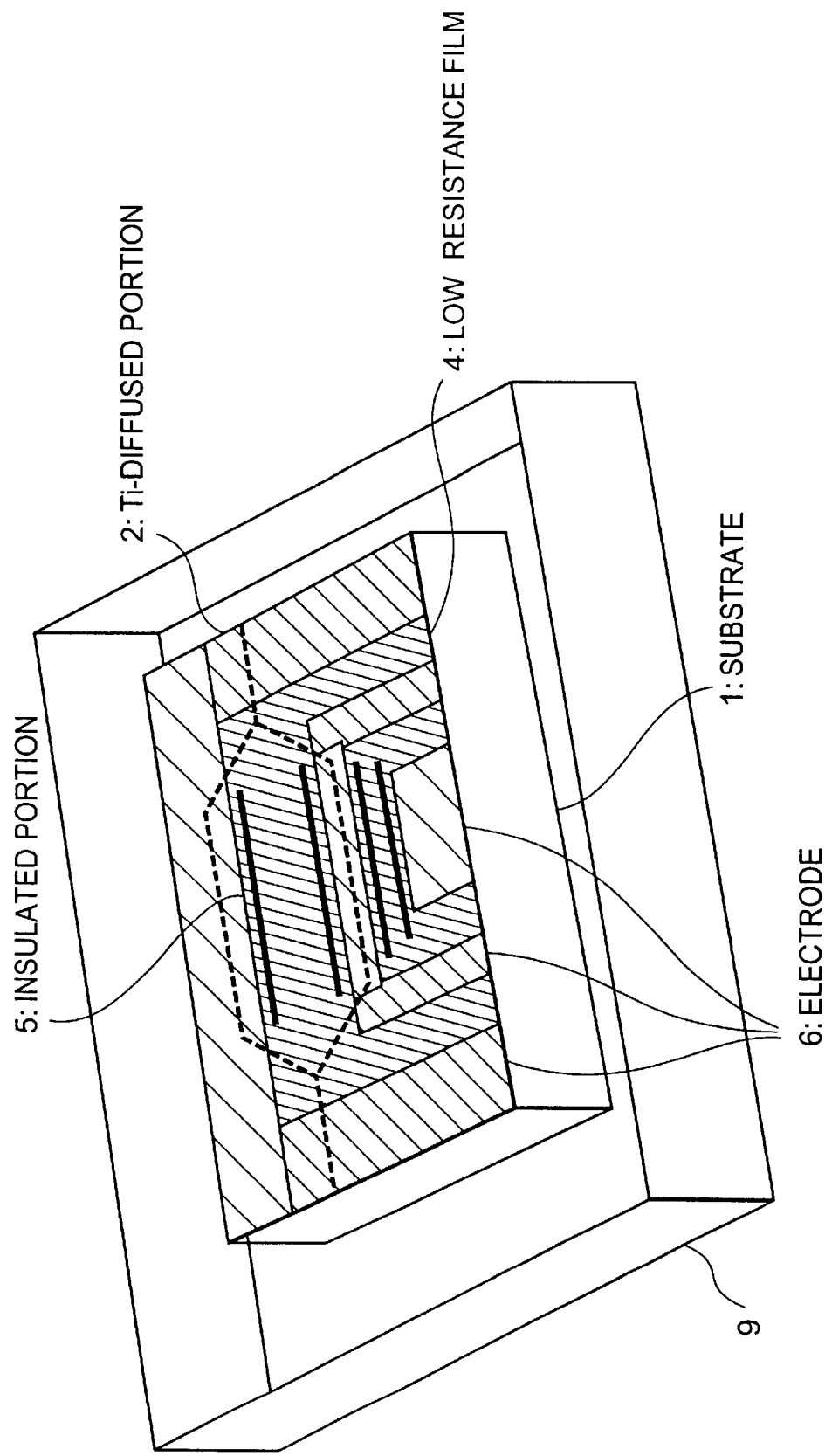
FIG. 4 shows a state where a light control device of the present invention is housed in a package.

Next, a case that a light control device is housed in a package. FIG. 4 shows a composition in which a light control device is housed in a package 9.

A temperature shift in case that a temperature difference has occurred between a portion represented by an equivalent circuit, namely, a portion (hereinafter referred to as an optical device portion) consisting of the optical waveguide 2, the buffer layer 3 and the low resistance layer 4 of the light control device, and a portion (hereinafter referred to as a package portion) consisting of the other portion than the optical device portion of the light control device and a package for housing the light control device is examined in the following. Since the optical device portion and the package portion are different in heat capacity from each other, both of them do not coincide in temperature change with each other. When the temperature $T_{pkg}(t)$ of the package portion varies as shown in the following expression (2):

$$T_{pkg}(t) = T_0 + \delta T_{pkg} \cdot u(t) \quad (2)$$

the temperature Tmod(t) of the optical device portion varies according to the following expression (3):

$$T_{mod}(t) = T_0 + \delta T_{pkg} \cdot [1 - \exp(-t/\tau_{pkg})] (\tau_{pkg} = C_{pkg} \cdot R_{pkg}) \quad (3)$$

where u(t) is a unit-step function, $C_{pkg}$ is the heat capacity of the package portion, and $R_{pkg}$ is the heat resistance (being in inverse proportion to the thermal conductivity). That is to say, the temperature change of the device depends upon the thermal time constant $\tau_{pkg}$ of the package portion.

In general, if an output (a step response) g(t) to be obtained when a unit step u(t) is inputted into a linear system is known, an output fo(t) in response to an arbitrary input f1(t) is represented by a superposition integral as the following expression (4):

$$f_0(t) = \frac{d}{dt} \int_0^t f1(x)g(t-x)dx \quad (4)$$

When substituting the second term in the right side of the expression (3) which is a temperature change of the device for the expression (4) and substituting the right side of the expression (1) which is a step response for g(t), the temperature shift $\delta V(t)$ of the optical device portion when the temperature of the package portion has been changed in step is given by the following expression (5):

$$\delta V(t) = \frac{Q}{C_{LN}} \frac{\tau}{\tau - \tau_{pkg}} \left( e^{-\frac{t}{\tau}} - e^{-\frac{t}{\tau_{pkg}}} \right) \quad (5)$$

When setting "$k=\tau_{pkg}/\tau$", the maximum value of $\delta V(t)$ is obtained after solving $d(\delta V(t))/dt=0$ as $$\delta V_{max} = \frac{Q}{C_{LN}} k^{\frac{k}{1-k}} \quad (6)$$

Figure 5:
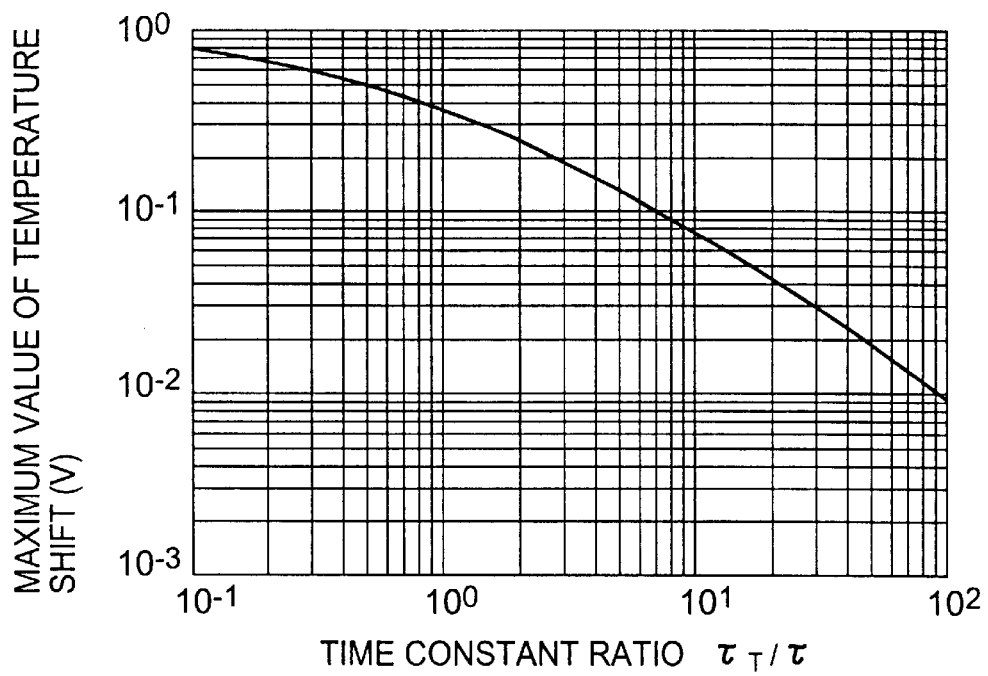
FIG. 5 shows a principle of the present invention.

The relation between k and $\delta V_{max}$ assuming "Q/CLN=1" is shown in FIG. 5. The value of $\delta V$. with respect to "k=1" is defined by the limit value obtained with "k→1" in the expression (6). As known from FIG. 5, it is effective to suppression of a temperature shift to enlarge k. For this purpose, it is enough to make large the $\tau_{pkg}$ of the package portion or make small the $\tau$ of the optical device portion.

FIG. 2 shows a perspective view of the optical device portion which is the first embodiment of the present invention. As described above, in this case an optical modulator by means of a Mach-Zehnder interferometer is assumed as the light control device.

Figure 6:
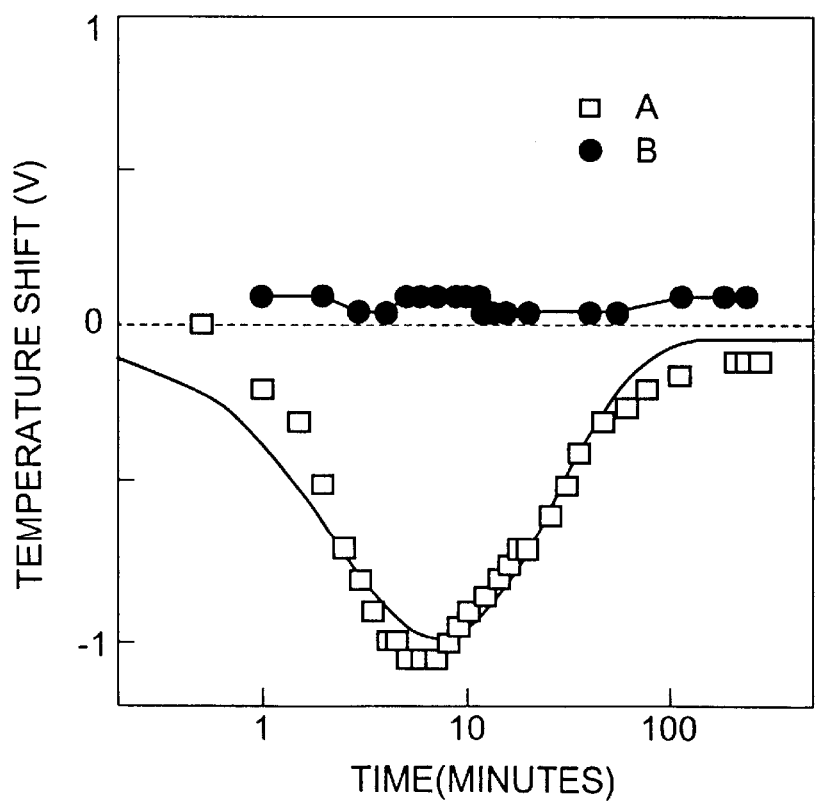
FIG. 6 is a graph showing a temperature shift of a light control device according to the present invention.

On the basis of the above analysis, a structure in which the composition of a package portion is not changed (namely, $\tau_{pkg}$ is fixed) is first shown as a structure for reducing a temperature shift. An optical device (corresponding to B in FIG. 6) in which R of $\tau(=CSiO_2 \cdot R)$ is lowered to as low as $10^8$ $\Omega/\square$ and an optical device for comparison (corresponding to A in FIG. 6) in which R is about $10^9$ $\tau/\square$ are respectively mounted in the same packages as each other. FIG. 6 is a result of evaluating the temperature shift when giving a stepped temperature change to these optical modulators. In comparison with A in FIG. 6, B was decreased to 0.2 V from 1.0 V, namely, to ⅕ or less in temperature shift quantity by more lowering the low resistance film in resistance. In this manner, the temperature shift can be suppressed by reducing R.

As described above, a temperature shift is suppressed by reducing R. In case of practically manufacturing a light control device, however, there is an optimal range of R determined according to a film forming method. As a film forming method for forming an amorphous semiconductor film known as a low resistance film there are a deposition method, a sputtering method, a CVD method, an MBE method and the like. Among them, for example, in forming an amorphous semiconductor film by means of a sputtering method it is effective to reduction of the resistance of a film to reduce a sputtering power or to increase a sputtering gas pressure. Under a condition in which the sputtering power is distant from the optimum condition, however, many defects occur when forming a film, and as a result the reproducibility of resistance value is lowered.

When the resistance value of a film varies in such a way, the value of R is different according to each film forming area and the yield rate of the manufactured devices is degraded. In order to keep a high yield rate in reduction of a temperature shift, therefore, it is necessary to form a film in a range in which a formed Si film is stable in resistance. Similarly, also in case of making high a gas pressure at the time of sputtering, when setting the gas pressure at an excessively high pressure, the plasma at the time of forming a film becomes unstable and the reproducibility of the resistance value of the film results in being degraded. In such a way, each of the film forming methods has the optimum range of its Si resistance value.

In the above-mentioned light control device, a low resistance film can be formed by means of a sputtering method. In FIG. 2, it is the resistance value of the low resistance film that corresponds to R of the expression (4). In case of using a semiconductor film as the low resistance film 4 in the above embodiment, it is desirable that its resistance value is less than $10^9$ $\Omega/\square$. The reason is that a temperature shift can be reduced to ⅕ or less as can be seen from FIG. 6. Moreover, the low resistance film of this embodiment may be replaced with a low resistance film formed by means of another method than a sputtering film forming method. A resistance value being as low as possible is desirable, so long as the low resistance can be secured in a good reproducibility by means of a CVD method, an MBE method and the like as a film forming method. Not only a semiconductor film but also a conductor film or an organic-compound-based conductor film can be used as the low resistance film.

In order to reduce R without changing the specific resistance of a low resistance film, it is effective also to increase its film thickness. In order to form a low resistance film uniformly on the whole surface of a wafer to be used, since a film thickness of at least 0.1 μm or more is needed, it is desirable that the film thickness is 0.1 μm or more. And a film having a lower resistance than the low resistance film may be formed on the surface or inside the film. In particular, the loss of a light control device such as an optical modulator and the like to an applied electric signal can be suppressed by forming additionally a lower go resistance film inside the film. The reason is that an electric signal applied to an optical waveguide when controlling light in an optical modulator and the like is an electromagnetic wave of a microwave band or millimeter wave band, an electric field leaks to a domain being several μm or less under the surface of a low resistance film due to a skin effect.

Figure 7:
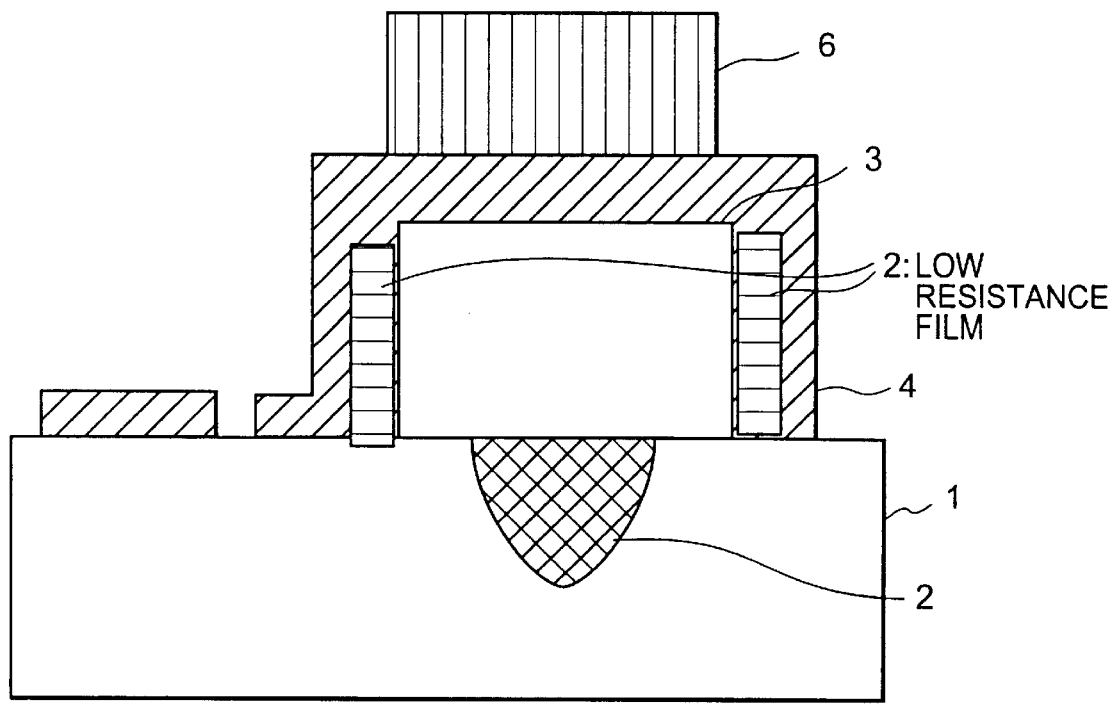
FIG. 7 is a sectional view showing the composition of another embodiment of the present invention.

And from an equivalent circuit shown in FIG. 3C, it is the vicinity of the interface between the low resistance film 4 and the buffer layer 3 and the vicinity of the surface of the substrate that determine the resistance value R of the low resistance film 4, and it is effective also to form in advance a second low resistance film having a lower resistance value only in the vicinity of these domains. FIG. 7 is a sectional view of an optical device showing the above-mentioned example. When forming a second low resistance film 7 in the vicinity of the buffer layer 3 in such a manner, R is almost determined by the resistance value of the second low resistance film 7 and is not influenced by the low resistance film 4. Accordingly, since R is made low in resistance and at the same time the low resistance film 4 comes to have no limitation, it becomes easy to manufacture the device.

And when Q/CLN is made small, it is seen from the expression (1) that the absolute value of a temperature shift is decreased. The Q is determined by a crystal material for a substrate and is in proportion to the quantity of a spontaneous electric charge in a ferroelectric crystal. Generally in a ferroelectric crystal, the quantity of a spontaneous electric charge (spontaneous polarization) and the electric power required for revealing an electro-optic effect used in controlling a wave-guided light are in proportion to each other. Therefore, it is difficult to suppress a spontaneous electric charge while controlling light with a low electric power.

Figure 8A:
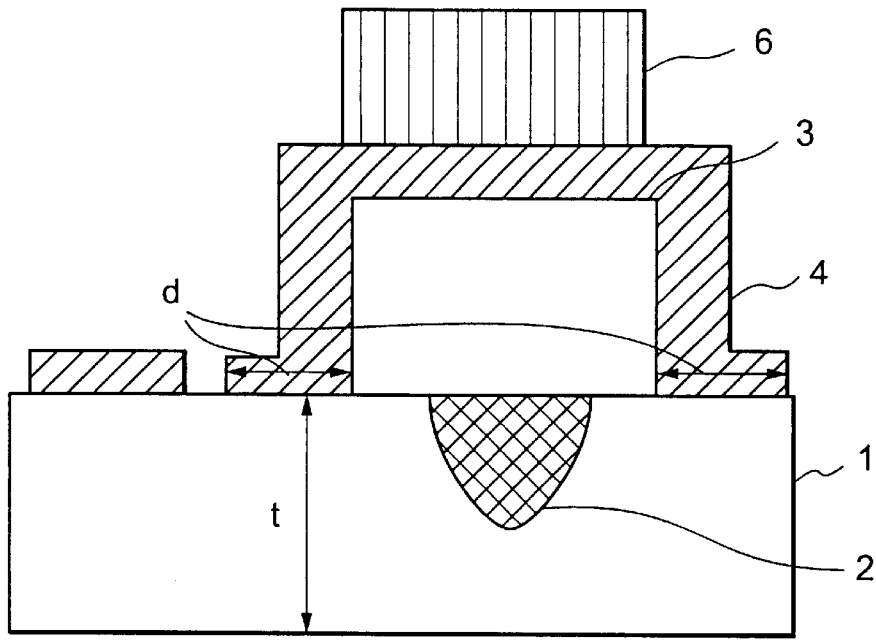
FIG. 8A shows a composition where the covering area of a low resistance film is made large and a substrate is made thin.
Figure 8B:
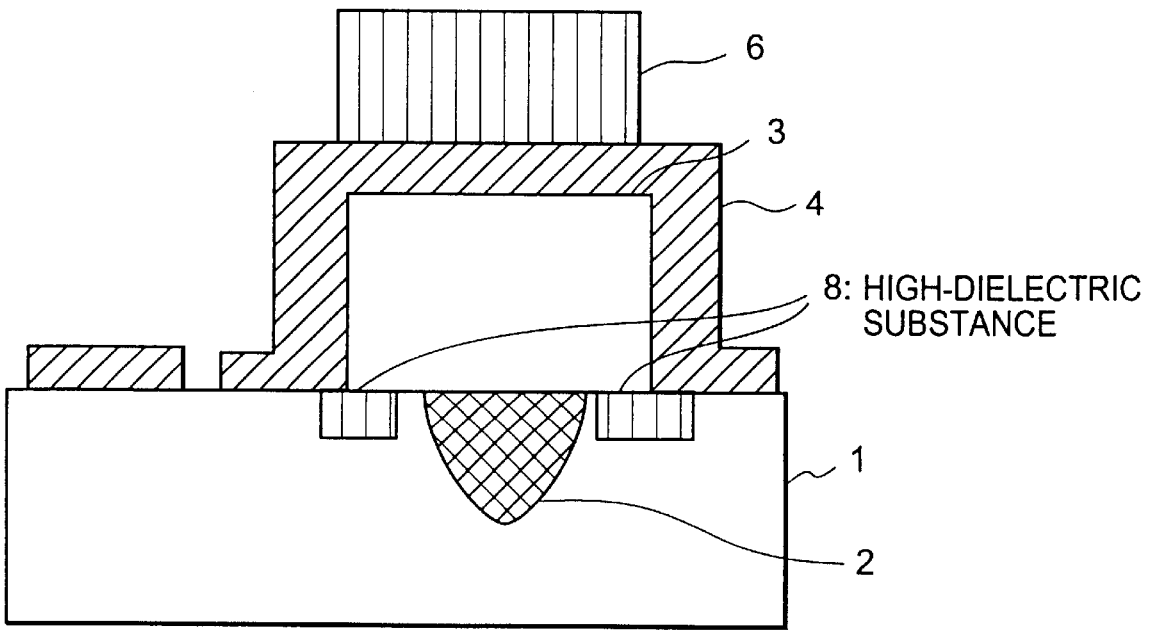
FIG. 8B shows a composition where the substrate has a material having a high dielectric constant incorporated in it.

On the other hand, it is possible to enlarge CLN. FIGS. 8A and 8B each are a sectional view of a device showing an embodiment for this purpose. In FIG. 8A, CLN is increased by making thinner the thickness t of a substrate and making longer the length d of a low resistance film covering the substrate. Particularly it is preferable from a viewpoint of the yield rate in a manufacturing process that the thickness t of a substrate is 0.8 mm or less. And since the covering length d of 2 $\mu$m or more is nearly equivalent to a domain to apply an electric field to an optical waveguide and minimizes the size of the device, this length is preferable.

And FIG. 8B shows an example in which a material having a higher dielectric constant than a substrate is formed in part of the substrate and equivalently a capacitor is connected in parallel. Such compositions of FIGS. 8B and 8A may be used at the same time.

In each of the above-mentioned embodiments, a composition making k of the expression (6) be 100 or more may be adopted. Particularly in case that Q/CLN cannot be controlled or in case that the structure of a device cannot be changed, since a temperature shift can be reduced by properly changing a package to house a light control device, this is an effective means. At that time it is preferable to set k at 100 or more, since Q/CLN is 10 or less and the maximum value of a temperature shift is reduced apparently from FIG. 5 in case of using a generally-used light control device in an ordinary ambient temperature.

In the above-mentioned embodiments, in case of forming a low resistance film, a method of doping a different element from the low resistance film into the film or performing a heat treatment after a film forming process is also effective to reduction of the resistance value. This method is well known as a method for controlling the resistance value of a semiconductor film. Doping may be to provide a film forming material directly with Ge, B, P or the like for example, and may be to apply an ion implantation method to a formed film itself. From a viewpoint of reproducibility of the resistance value of a film, it is more effective to apply a doping process to a film forming material.

And when a film is formed in case that the ground structure is complicated, since the film forming speed varies in the substrate, the resistance value of a film may not become uniform. In this case, the uniformity of a film is improved by heating the formed film in a pure gas atmosphere or in vacuum at a temperature of 100 to 300° C. for several hours. Particularly when using an inert gas a surface reaction is also suppressed in a heating process. And it is possible also to control the resistance value by a heat treatment after a film forming process. And it is effective to reduction of the resistance value also to give an electromagnetic-wave energy such as an electron beam, ultraviolet rays and the like to the surface of a low resistance film. And it is effective to reduction of the resistance value also to generate defects at the beginning of forming a film by roughening uniformly the ground face by means of etching or a chemical reaction prior to forming a low resistance film.

A semiconductor material such as Si, Ge or the like, a conductor material such as ITO and an organic-compound-based conductive material can be used as the low resistance material. And the film forming can be performed by means of a process of CVD, sputtering, dip-coating, deposition, NBE and the like.

Since the time constant $\tau$ of a device is in proportion to $CSiO_2$, a structure for reducing $CSiO_2$ is also effective to reduction of a temperature shift. The $CSiO_2$ is in proportion to the dielectric constant of a buffer layer and the area of an electrode, and is in inverse proportion to the spacing between the electrodes. The dielectric constant can be reduced to 4 or less by properly selecting a film forming condition and a material. Since the length of an electrode length of a device is in proportion to the area of the electrode, the area of the electrode is preferably 0.42 mm2 or less. Since $CSiO_2$ is reduced when the thickness of a buffer layer is made thicker, it is possible also to form a buffer layer of 0.9 $\mu$m or more in thickness.

In the above-mentioned embodiments, it is possible to take a structure in which $\tau$ of the expression (3) is 5 seconds or less. The optical modulator evaluated in FIG. 6 is considered as a general optical device. When obtaining a time constant as assuming that the electrode is 40 mm in length, the buffer layer is 4 in dielectric constant and 1 $\mu$m in film thickness, and the low resistance film 4 is $10^4$ $\Omega$ cm in specific resistance and 0.1 $\mu$m in film thickness, the time constant of about 5 seconds is obtained and an electric charge generated on the surface of the substrate in case of receiving a temperature change of about 1° C./minute can be neutralized. In case that temperature varies more quickly than 1° C./minute, $\tau$ needs to be made smaller. To keep constant the ratio of a time constant to a temperature change rate is preferable thanks to making it possible to reduce the temperature shift in a similar manner.

In the above-mentioned embodiments, a material for a package can be composed of a material of 0.52 $J \cdot K^{-1} \cdot g^{-1}$ at 373 K in specific heat at constant pressure. The heat capacity CPC of the package portion can be made large by making large the specific heat of a material for the package. The larger the $C_{pkg}$ becomes, the larger $\tau_{pkg}$ becomes and the larger k becomes from the expression (3). When k is larger, the maximum value of a temperature shift is decreased according to the expression (6). Particularly, some of materials of inorganic compound or liquid such as oil may have a heat capacity being 10 or more times larger than metal and may be effective to suppression of a temperature shift.

Figure 9:
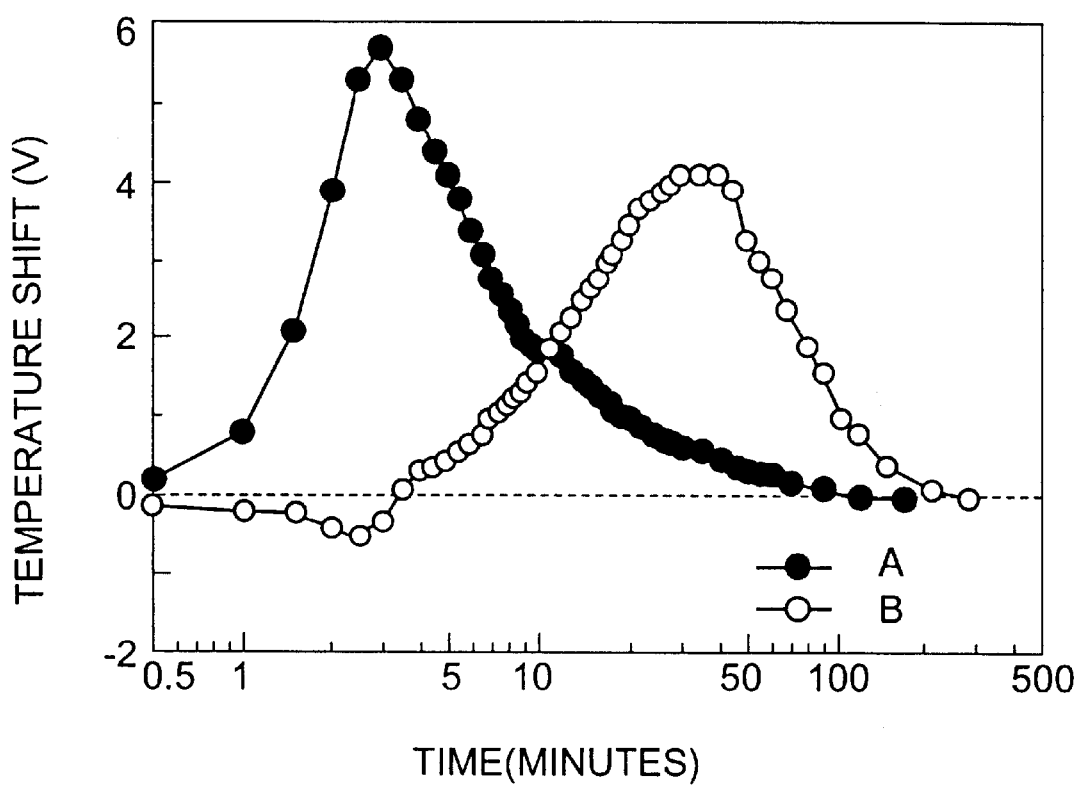
FIG. 9 is a graph showing a temperature shift in case of using a different package material.

And when the heat resistance $R_{pkg}$ of the package portion is made larger, k is increased. Since a heat resistance is the inverse number of a thermal conductivity, a thermal conductivity of 16.5 $W \cdot m^{-1} \cdot K^{-1}$ or less at 300 K is effective to reduction of a temperature shift. Particularly among liquid materials there is a material being lower in thermal conductivity than metal by one digit or more, and such a material reduces a temperature shift according to the expression (6). As an example, the temperature shifts of equivalent devices mounted in packages being different in $\tau_{pkg}$ were evaluated. FIG. 9 shows a result of evaluation of temperature shifts in a temperature change from 65° C. to 85° C., and the axis of abscissas represents time and the axis of ordinates represents the quantity of a temperature shift. In FIG. 9, the mass of a package corresponding to an evaluation result shown by B is about 10 times the mass of a package corresponding to A. Time constant $\tau_{pkg}$ of the package portion is in proportion to (specific heat)/(thermal conductivity) and B is about 12 times larger in the value of this ratio than A. From FIG. 9, a package being larger in this ratio is reduced more in temperature shift and this coincides with a result expected from the expression (6).

And in the same volume of the same material, the larger the surface area is made, the better the heat radiation efficiency is made. For example, while a package formed out of unit elements each being in the shape of a sphere has a ratio of surface area to volume of about 2.2, a package formed out of only cubic unit elements has a ratio of 6 as this ratio and becomes two or more times in heat radiation efficiency. Therefore, when a package contains cubic elements as its components, its $\tau_{pkg}$ becomes larger. In addition to this, a method for the surface area can utilize the structure of a heat sink portion used in a power supply circuit, a microprocessor and the like.

The present invention can be implemented in an optical modulator, an optical switch, an optical filter, an optical isolator, an optical coupler, an optical sensor and the like which use an optical waveguide. It is apparent that the present invention is not limited to the above-mentioned embodiments, but can be properly modified in the scope of the technical idea of the present invention.

As described above, according to the present invention, in a light control device consisting of an optical waveguide formed on the surface of a ferroelectric crystal substrate, it is possible to suppress a non-bias temperature shift by means of a composition in which the resistance value, capacity, heat capacity and thermal conductivity of each of its components are controlled. Such a composition can neutralize in a short time an electric charge generated on the surface of a substrate when the substrate varies in temperature, and can suppress an operation point shift at the time of change in temperature.

While this invention has been described in connection with certain preferred embodiments, it is to be understood that the subject matter encompassed by way of this invention is not to be limited to those specific embodiments. On the contrary, it is intended for the subject matter of the invention to include all alternatives, modifications and equivalents as can be included within the spirit and scope of the following claims.

What is claimed is:

1. A light control device comprising:
   an optical substrate having a pyroelectric effect;
   a buffer layer formed on said optical substrate;
   a first low resistance film covering said buffer layer; and
   a second low resistance film formed between said first low resistance film and said buffer layer,
      wherein the resistance value of said second low resistance film is smaller than the resistance value of said first low resistance film.

2. The light control device according to claim 1, wherein; the sheet resistance of said first low resistance film is less than $10^9 \Omega/\square$.

3. The light control device according to claim 1, wherein; the sheet resistance of said first low resistance film is not less than $10^5 \Omega/\square$ and not more than $10^{10} \Omega/\square$.

4. The light control device according to claim 1, wherein; the sheet resistance of said first low resistance film is not less than $10^8 \Omega/\square$ and not more than $10^9 \Omega/\square$.

5. The light control device according to claim 1, wherein; the product of the capacitance of said buffer layer and the resistance value of said first low resistance film is not more than 5 seconds.

6. The light control device according to claim 1, wherein;
   an optical waveguide is formed in said optical substrate, and
   the ratio of the product of the specific heat and the thermal conductivity of said light control device excluding said buffer layer, said first low resistance film and said optical waveguide to the product of the capacitance of said buffer layer and the resistance value of said first low resistance film is not less than 100.

7. The light control device according to claim 1, wherein;
   the thickness of said optical substrate is not more than 0.8 mm, and the covering length of said first low resistance film in part where said first low resistance film is in contact with said optical substrate is not less than 2 $\mu$m.

8. The light control device according to claim 1, further comprising;
   a package for housing said optical substrate, said buffer layer and said first low resistance film, wherein;
   the ratio of the surface area to the volume of said package is not less than 6.

9. The light control device according to claim 1, wherein;
   an optical waveguide is formed in said optical substrate, and
   the ratio of the specific heat to the thermal conductivity of said light control device excluding said buffer layer, said first low resistance film and said optical waveguide is not less than 1.0.

10. A light control device manufacturing method for manufacturing a light control device comprising an optical substrate having a pyroelectric effect, a buffer layer formed on said substrate and a first low resistance film covering said buffer layer, said light control device manufacturing method comprising:
    forming said buffer layer on said optical substrate;
    forming a second low resistance film on said buffer layer; and
    forming said first low resistance film covering said buffer layer and said second low resistance film,
       wherein the resistance value of said second low resistance film is smaller than the resistance value of said first low resistance film.

11. The light control device manufacturing method according to claim 10, further comprising;
    doping an impurity into said first low resistance film.

12. The light control device manufacturing method according to claim 10, further comprising;
    heating said first low resistance film.

13. The light control device manufacturing method according to claim 10, further comprising;
    roughening the ground face by means of one of etching and chemical reaction prior to forming said first low resistance film.

14. The light control device manufacturing method according to claim 10, further comprising;
    a process of applying an electromagnetic-wave energy to the surface of said first low resistance film.

15. A light control device comprising:
    two optical waveguides formed adjacent to each other on a crystal substrate having an electro-optic effect;
    a buffer layer which is formed on part of said optical waveguides and has a smaller dielectric constant than said substrate;
    a low resistance film which is formed on said buffer layer and part of said substrate and is smaller in resistance than any of said buffer layer and said substrate;

signal electrodes being formed respectively in the vicinity of said optical waveguides; and two ground electrodes being opposite to each other with said signal electrode between them, wherein said low resistance film is cut at plural spots in the vicinity of said optical waveguides, and wherein a film having a smaller resistance than said low resistance film is formed between said buffer layer and said low resistance film.

16. The light control device according to claim 15, wherein;

the product of the resistance and the capacitance formed by said low resistance film and said buffer layer is not more than 5 seconds.

17. The light control device according to claim 15, wherein;

the ratio of the product of the resistance and the capacitance formed by said low resistance film and said buffer layer to the product of the specific heat and the thermal conductivity of said light control device excluding said buffer layer, said low resistance film and the said optical waveguides is not less than 100.

18. The light control device according to claim 15, wherein;

said low resistance film is an Si film, and an impurity is doped into said Si film.

19. The light control device according to claim 15, wherein;

said low resistance film is an Si film, and a heating process is applied to said Si film.

20. A light control device comprising:

an optical substrate having a pyroelectric effect;

a buffer layer formed on said optical substrate; and a first low resistance film covering said buffer layer, wherein the product of the capacitance of said buffer layer and the resistance value of said first low resistance film is not more than 5 seconds.

* * * * *